United States Patent
Hobbs et al.

(10) Patent No.: US 7,650,519 B1
(45) Date of Patent: Jan. 19, 2010

(54) METHODS AND APPARATUS FOR MANAGING A USER INTERFACE ON A POWERED NETWORK

(75) Inventors: David Victor Hobbs, Surrey (CA); Ian Cameron Main, Vancouver (CA)

(73) Assignee: Teradici Corporation (CA)

( * ) Notice: Subject to any disclaimer, the term of this patent is extended or adjusted under 35 U.S.C. 154(b) by 527 days.

(21) Appl. No.: 11/535,016

(22) Filed: Sep. 25, 2006

Related U.S. Application Data (60) Provisional application No. 60/726,485, filed on Oct. 12, 2005.

(51) Int. Cl.
*G06F 1/00* (2006.01)
*G06F 1/32* (2006.01)

(52) U.S. Cl. .................. 713/300; 713/320; 713/330

(58) Field of Classification Search .................. 713/300
See application file for complete search history.

(56) References Cited

U.S. PATENT DOCUMENTS 7,281,146 B2 * 10/2007 Nalawadi et al. ............ 713/320
7,353,407 B2 * 4/2008 Diab et al. .................. 713/300
7,444,526 B2 * 10/2008 Felter et al. ................. 713/300
7,509,505 B2 * 3/2009 Randall et al. .............. 713/300

OTHER PUBLICATIONS

"Better Power Management with Powered Data Ports", Digi International Inc. White Paper Publication 91001308, 2005.
JackPC Marketing Brochure, Chip PC Technologies, Document Barcode CMD02348.
Q-Term G70 Datasheet v3.2, QSI Corporation 2005.
"POET6000 Ultra-thin touch-screen computers Powered by Ethernet Datasheet", DSP Design Ltd, Tapton Park Innovation Centre, Chesterfield, United Kingdom.

* cited by examiner

*Primary Examiner*—Suresh K Suryawanshi (57) ABSTRACT

A system and methods for connecting a graphic user interface to a powered network is disclosed. The network-powered graphic user interface system converts encoded computer user interface signals transmitted over a powered network cable to multiple signal sets, each set associated with a peripheral device interface. Methods for managing the admission of the peripheral devices are also described. Connection criteria include the power budget for the connection, device characteristics, device power requirements and the characteristics of other devices sharing the powered network connection.

24 Claims, 5 Drawing Sheets

METHODS AND APPARATUS FOR MANAGING A USER INTERFACE ON A POWERED NETWORK

RELATED APPLICATIONS

This application claims priority to U.S. Provisional Patent Application Ser. No. 60/726,485, entitled REMOTE GRAPHIC USER INTERFACE SYSTEM AND METHODS USING POWER OVER ETHERNET, filed Oct. 12, 2005, incorporated herein by reference in its entirety.

FIELD OF THE INVENTION

The present invention relates broadly to providing an interface between a host computing appliance and a user interface. Specifically, the present invention relates to managing a remote graphic user interface including display and peripheral devices over a powered network connection.

BACKGROUND OF THE INVENTION

Historic advances in computer technology have made it economical for individual users to have their own computing system which caused the proliferation of the Personal Computer (PC). Continued advances of this computer technology have made these personal computers very powerful but also complex and difficult to manage. To improve manageability in workplace environments, it has become desirable to separate the user interface devices, including the display, keyboard, mouse, audio and other peripheral devices from the application processing parts of the computing system. In this configuration, the user interface devices are physically located at the desktop, while the processing and storage components of the computer are placed in a central location. The user interface devices are then connected to the processor and storage components with some method of communication. In the emerging networked home entertainment environment, similar powerful computing platforms are being used to host consumer applications and deliver media content. In the home environment, it is also desirable to centralize the application processing parts both for aesthetic appeal and easier maintenance. In this configuration, graphic user interfaces are distributed around the home in convenient locations using the minimum necessary cabling.

Historically, two separate networks have been required to support remote user interfaces in either of these environments, each with associated installation and ongoing maintenance costs. Firstly, user interfaces require electrical power to operate, typically supplied by multiple power cables connected to a power outlet. Secondly, user interface signals are delivered over an IP network which means that the graphic user interface requires additional data cabling connected to the central computing equipment. Additionally, the requirement for network devices to connect to an electrical power source complicates installation, increases costs and limits the location of the user interfaces to locations where electrical power and data network connections are available. Furthermore, for user interface equipment to operate during electrical power supply interruption, each device must either incorporate an internal battery backup system or must be connected to an Uninterruptible Power Supply (UPS). Therefore, to reduce the number of electrical cables, power receptacles and connections, it is desirable to eliminate the need for each user interface device to be connected to a power outlet. This also simplifies equipment installation and provides a cost effective means for providing uninterrupted power to multiple user interfaces.

User Interface systems that use powered networks as an alternative to using separate power and data connections are known in the art. For example, IEEE802.3af™ specifies a powered Ethernet infrastructure for supporting Voice-over-IP phones or video phones, thin client platforms, Ethernet-enabled graphic terminals, Point-of-Sale (POS) terminals and other devices with a user interface. The limitation with display systems such as POS terminals, video phone systems and Ethernet-enabled graphics displays is that they process the user interface locally, reducing performance and resulting in an inability to meet the processing requirements of full frame rate user interfaces needed for computer desktop and home entertainment applications. An associated limitation with these systems is that they do not provide the generic peripheral interfaces expected of desktop computing platforms.

Modules that use the features of a powered network to reduce desktop cabling of user interface systems are also know to the art. For example, JackPC™ from Chip PC Technologies is a thin client computer integrated in a wall LAN jack housing. The problem with thin client solutions is that they rely on remote desktop protocols such as Microsoft RDP, Citrix ICA, Sun Ray or VNC which have limited graphics and peripheral support capabilities. Another problem is that they also require a client-side operating system which adds to complexity of the system and increases the equipment costs and ongoing maintenance expenses. A further common problem is that the power management methods of the peripheral interfaces are undefined, leaving power allocation decisions in the hands of the user.

In summary, existing powered network devices have limited capabilities aimed at addressing specific market requirements. None of the methods described takes advantage of the features provided by a powered network to reduce desktop cabling while also providing a full-featured remote graphic user interface. Therefore, a better solution is needed that meets the generalized needs of equipment such as remote desktops in the workplace or home entertainment systems.

SUMMARY OF THE INVENTION

The present invention enables the efficient operation of a full-featured graphic user interfaces over a powered network connection.

In one aspect, the present invention provides a peripheral device interface module that applies peripheral admission criteria and power budget requests to power sourcing equipment based on power consumption of display devices, other peripherals and the power classification of the module. Unlike existing thin client systems, the present invention optimizes system-wide power consumption and provides self-administration methods for the connection of peripheral devices to a powered network based on allocated power budgets, including the connection of peripherals using different interface standards and buses to that of the powered network.

In another aspect, the described invention provides a display and peripheral device interface module for converting between encoded computer user interface signals transmitted over a single powered network cable and individual signals transmitted over separate independent digital interfaces and power connections. Unlike network-powered thin client products, the module does not require a complex operating system that needs to be maintained as devices and applications are changed. This lowers system complexity, equipment costs and maintenance expenses. Unlike remote terminals, the module supports the same range of peripheral devices with the same features as if the peripherals were connected directly to the host computer. This full-featured peripheral support is enabled without any modifications to the module.

In another aspect, the described invention provides an auxiliary network interface that enables efficient integration with other network appliances such as a VoIP phone. This aspect of the described invention further reduces desktop equipment costs.

In summary, the present invention provides a full-featured remote user interface that is compatible with a diversity of user interface devices but relieves the user of the burden peripheral power management considerations by allocating and managing power budgets between the available interfaces.

Other features and advantages of the present invention will become apparent from reading the following detailed description, when considered in conjunction with the accompanying drawings, in which:

DETAILED DESCRIPTION

Figure 1:
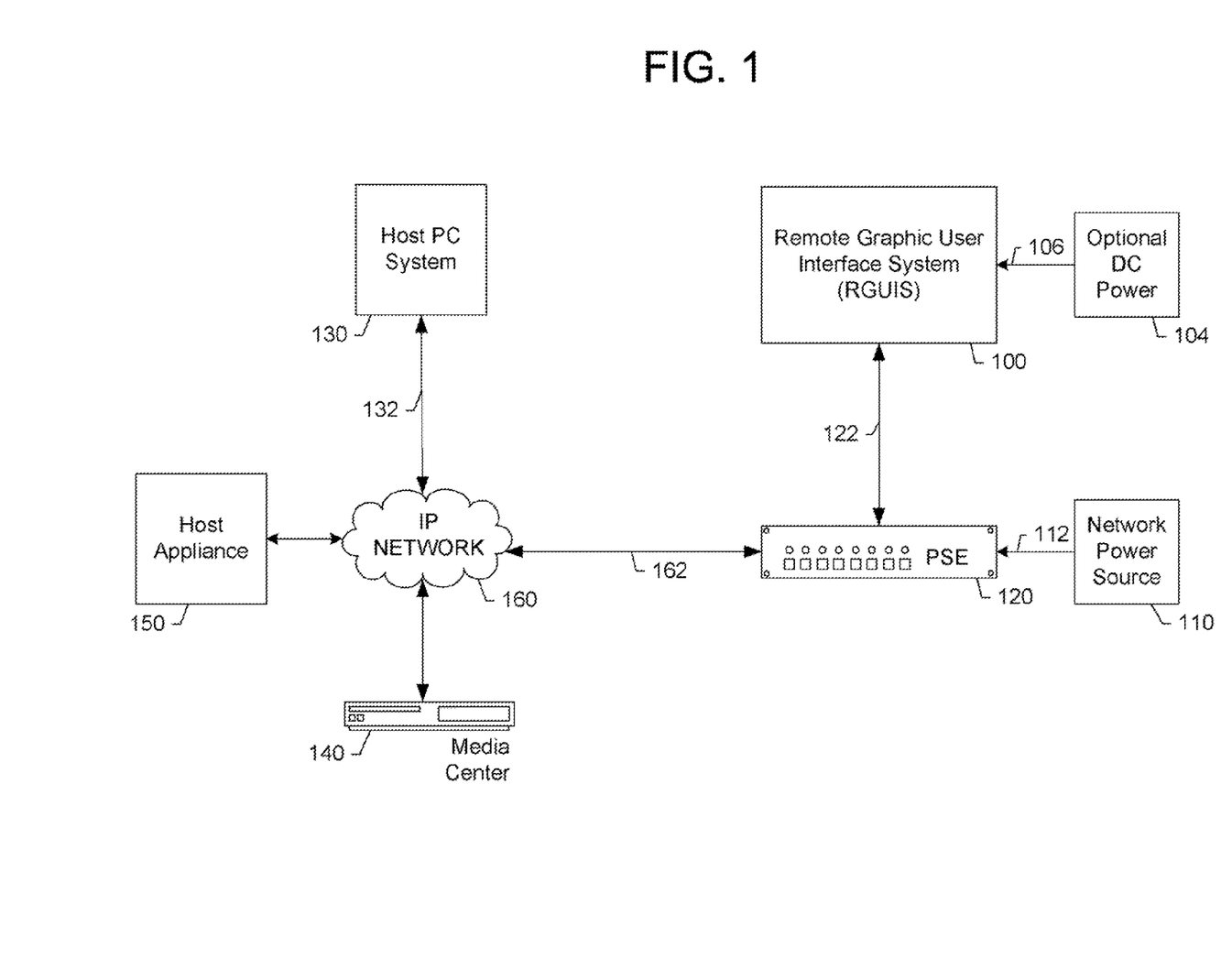
FIG. 1 is an illustration of an architecture for a remote graphic user interface system that uses a powered network connection to connect a display and other user interface devices to a PC and other host appliances separated by a computer network.
Figure 2:
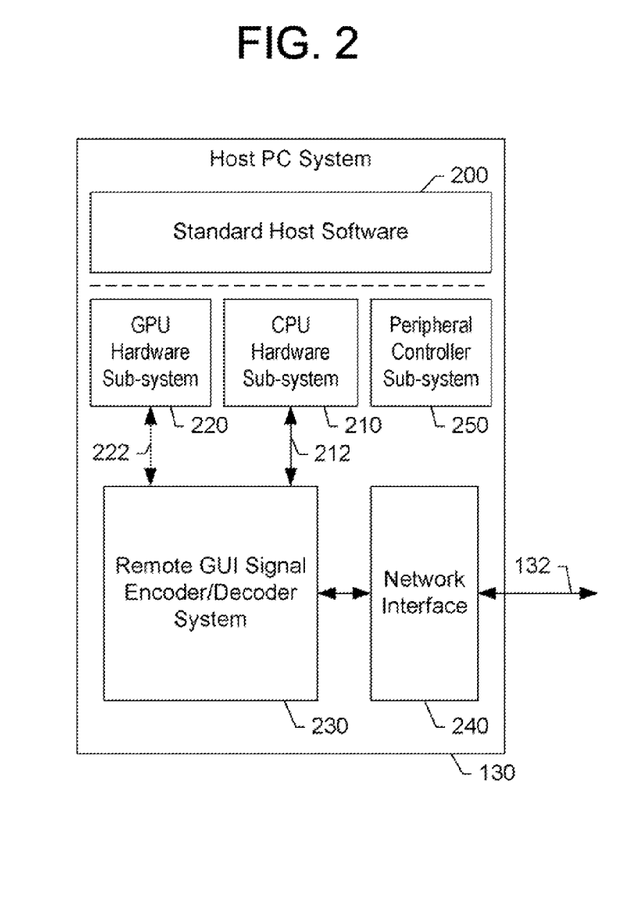
FIG. 2 is an illustration of an embodiment of a host PC system.

FIG. 1 shows an architecture for a remote graphic user interface system that uses a powered network connection to connect a display and other user interface peripheral devices to a PC and other host appliances separated by a computer network. In the embodiment shown, host PC system 130 is connected to standard IP network 160 by standard network connection 132. Host PC system 130, further described in FIG. 2, is located at a different location to the user interface, separated by network 160. Media center 140 and host appliance 150 are also connected to network 160. Media center 140 runs a user interface application such as the "Globally Executable Multimedia Home Platform" (GEM or MHP). In an alternative embodiment, media center 140 is controlled indirectly via a master host appliance such as host PC system 130 or another host appliance. One example of host appliance 150 is a home automation controller but the present invention is applicable to other networked host appliance that supports a graphic interface. Other embodiments support more or fewer host systems. Network 160 is connected to Power Sourcing Equipment (PSE) 120 by link 162 which communicates encoded graphic user interface signals including media, control and peripheral device signals between hosts 130, 140 and 150 shown and PSE 120. In the described embodiment, PSE 120 is an IEEE 802.3af-compliant midspan insertion device but other embodiments where PSE 120 is an end-span insertion device or other device suitable for network power distribution are possible. In the described embodiment, network 162 is a wired Ethernet network but alternative embodiments such as a wireless IP network are equally applicable.

Figure 3:
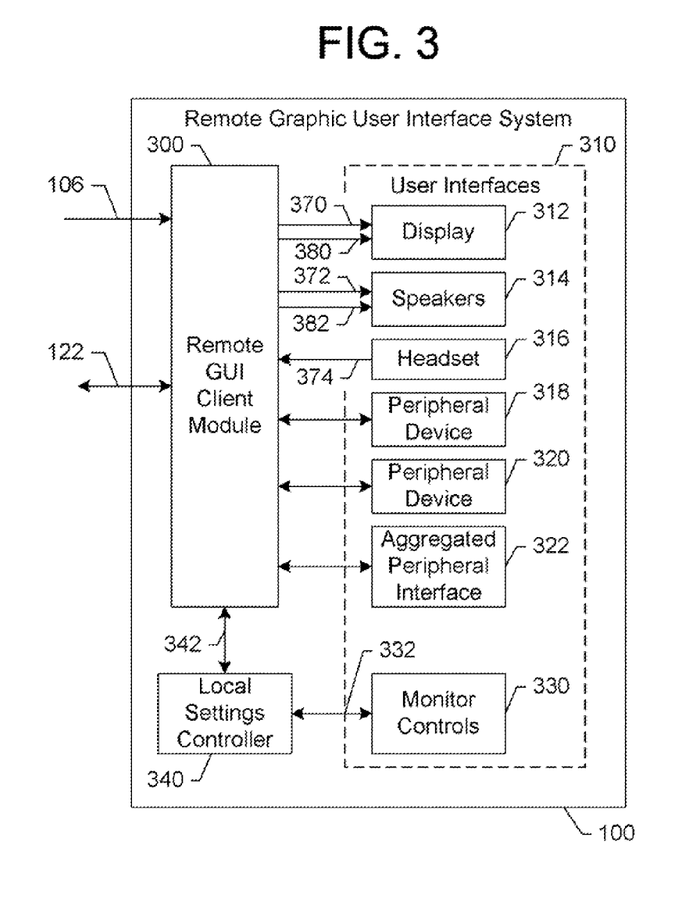
FIG. 3 is an illustration in block diagram form for an embodiment of a remote graphic user interface system.

Remote Graphic User Interface System (RGUIS) 100, described in FIG. 3, connects to PSE 120 using powered connection 122. In the described embodiment, connection 122 is an IEEE802.3af™ Power-over-Ethernet compliant connection but the present invention is also applicable to higher power versions such as "PoE Plus" or other suitable powered networks. Connection 122 is a conduit for several connections. Firstly, it provides a continuation of signals on link 162. Secondly, it provides a power connection. RGUIS 100 is powered by network power source 110 connected to PSE 120 via power link 112. Thirdly, it provides a power control connection between RGUIS 100 and PSE 120. RGUIS 100 may also have back-up power link 106 provided by optional DC power module 104. For example, power source 104 may be a battery local to RGUIS 100. In the embodiment shown, power source 104 provides supplementary power which enables RGUIS 100 to support an increased number of connected peripheral devices. In an alternative embodiment connection 122 provides sufficient power for RGUIS 100 and power source 104 is not required.

In the embodiment, host PC system 130 generates the content for RGUIS 100 using the same methods as if it was generating content for a local graphic user interface. Full frame media signal streams are generated and encoded by host PC system 130 or other hosts shown. This method of transferring media content between host and client systems is different to those thin client systems that transfer graphic commands between host and client systems which provide limited frame rate and graphic drawing capabilities. RGUIS 100 does not require drivers, application data or the processing performance of host PC system 130. Interface signals are bridged to a target host system such as host PC system 130 and managed by the host using the same methods as if directly connected to the host. Therefore, device interface components such as drivers for peripheral devices (e.g. mouse, keyboard or display) do not need to be managed by RGUIS 100. This aspect of the architecture differs from thin client architectures such as RDP or systems that incorporate bridging peripheral device drivers in the remote graphic user interface equipment.

FIG. 2 describes an embodiment of system 130 of FIG. 1. In the embodiment shown, standard software 200 comprising application software, operating system and drivers performs normal PC application processing functions supported by standard GPU hardware sub-system 220 and standard PC hardware sub-system 210 comprising CPU, chipset and memory. In alternative embodiments, GPU hardware sub-system 220 is either integrated as a component of CPU hardware sub-system 210 or software 200.

The described system and methods replace peripheral controller sub-system 250 with remote GUI Signal Encoder/Decoder module 230. In a standard PC, peripheral controller sub-system 250 provides hardware interfaces for user interface devices, including USB, Firewire and audio host controllers.

Module 230 is a hardware processing module that interfaces to CPU and GPU hardware using the same methods as non-bridged peripheral controllers. In the embodiment, user interface device signals are transported between software 200 and module 230 using a PCI-Express system bus. Video signals are bridged from GPU hardware sub-system 220 using a Digital Visual Interface (DVI) connection 222. Other standard peripheral interconnects are also possible. For example, in an alternative embodiment, module 230 is a software module that executes on sub-system 210. Module 230 encodes interface and control signals from software 200 bound for RGUIS 100 and transfers them to network interface 240 for communication over link 132. Interface 240 shown is a dedicated network connection but may be integrated with hardware 210. Module 230 also de-multiplexes and decodes inbound signals received by interface 240 from RGUIS 100, including user interface and control signals bound for software 200.

FIG. 3 shows a block diagram for an embodiment of RGUIS 100. Powered connection 122 connects to remote GUI client module 300 which provides a bridge between user interfaces 310 and networked host systems including system 130 in FIG. 1. In the host-bound direction, module 300 encodes user interface and control signals. In the peripheral-bound direction, it decodes user interface signals and control signals from the host(s) bound for the display and peripheral devices.

In the embodiment shown, module 300 provides Digital Visual Interface (DVI) connection 370 for display 312. Secondary power connection 380 supplies display 312 with power at a specified display voltage. Module 300 provides High Definition Audio (HDA) connection 372 for powered speakers 314. Secondary power connection 382 supplies speakers 314 with power at a specified voltage. In alternative embodiments, additional secondary power connections to other peripheral devices may be provided by module 300. Module 300 also provides headset connection 374 for headset 316. Peripheral interfaces 318 represents a Bluetooth interface and peripheral Interface 320 represents a USB interface. Aggregated peripheral interface 320 is an integrated USB hub connected to module 300. In other embodiments, the present invention enables the connection of any peripherals suitable for direct connection to a host PC system. Table 1 provides a non-exhaustive list of peripherals suitable for use in RGUIS 100.

TABLE 1

Peripheral Device Examples

| Peripheral Device Class | Example device |
| --- | --- |
| Display | CRT, LCD or Plasma Monitors |
| Audio In | Microphone, Audio player |
| Audio Out | Headphones, 5.1 Surround Speaker System |
| General Peripheral | Printer, scanner, RFID Reader |
| Remote Control | Bluetooth Remote Control, IR Control |
| Sensory or Biometrics | Fingerprint Scanner |

In other embodiments, external peripherals listed in Table 1 are integrated with module 300. For example, module 300 may include a biometric sensor as a security feature. In other embodiments, module 300 supports any of the standard interfaces associated with a PC environment. Table 2 provides a non-exhaustive list of interfaces supported by alternative embodiments.

TABLE 2

Peripheral Interface Examples

| Peripheral Interface Class | Example Interface |
| --- | --- |
| Display | Digital: DVI; HDMI; DPVL; DDC; Display Port<br>Analog: VGA-based, YCrCb, S-video |
| Audio In | Analog or digital<br>e.g. SPDIF, pluggable HD Audio |
| Audio Out | Analog or digital<br>e.g. SPDIF, pluggable HD Audio |
| General Peripheral Interfaces | Wired or wireless USB<br>Firewire<br>PS2<br>Bluetooth<br>802.11 |
| Remote Control | Infrared e.g. IrDA<br>Radio e.g. Bluetooth |
| On-module | Microphone, speakers, Status indication (e.g. LED or LCD) |

In the embodiment described, some local control processing may also occur at RGUIS 100. One example is a user control function managed directly by RGUIS 100. For example, display 312 may include integrated volume, brightness and contrast control buttons. In such a case, monitor control module 330 uses local settings controller 340 to change the local settings using control connection 332. Alternatively, the user may adjust the setting using software 200 (in FIG. 2). In this case, a control command is transmitted from host PC system 130 and module 300 instructs local settings controller 340 to adjust the volume using peripheral control connection 332 shown. In other embodiments, one or more user interfaces may be managed by a combination of software 200 and local settings controller 340.

Figure 4:
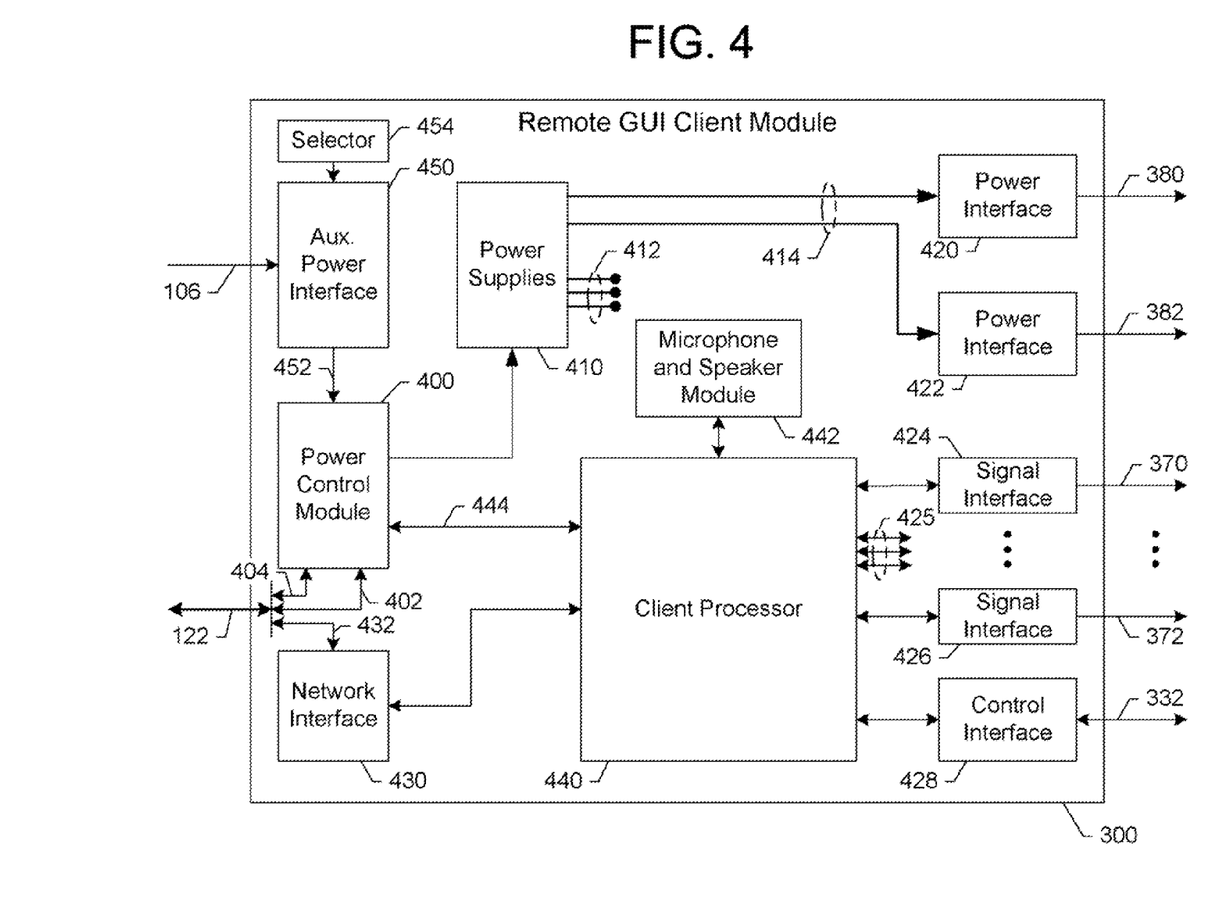
FIG. 4 is an illustration of an architecture for an embodiment of a remote graphic user interface client module.

FIG. 4 illustrates the architecture for an embodiment of module 300 in FIG. 3. The described module enables the bridging of multiple peripheral devices across powered connection 122 and supports client processing and other integrated features. In the embodiment described, power control module 400 provides a power conversion interface between power signal 402 delivered over connection 122 and module 300. Power control module 400 performs detection, classification, inrush current limiting, and switch FET control for compliance with the IEEE 802.3af standard. An example component that provides this functionality is the Texas Instruments TPS2370 switch. Power control module 400 also includes signaling channel 404 for communications with PSE 120, used for power requests and submission of classification information. In an IEEE 802.3af embodiment, this connection is defined by a set of power interface (PI) conductors using a defined protocol but other embodiments are also possible.

Power conversion functions may also include the application of peripheral admission methods based on assigned power budget and the monitoring and limiting of power consumed by individual peripherals. In one embodiment, power control module 400 operates in conjunction with client processor 440 to execute peripheral admissions methods that manage the supply of power to RGUIS 300 independent of a host PC or other host. In another embodiment, power control module 400 operates in consultation with a host such as host PC system 130 in FIG. 1. One example of host consultation involves restricting device admission based on administrator approval. Another example of host consultation involves providing user notification in cases of admission failure or run-time power violation.

Power supply 410 uses the unregulated DC voltage provided by power control module 400 to generate a series of regulated and unregulated power supply levels, including module power 412 for powering module 300. Peripheral power 414 provides power for peripheral devices. In the embodiment shown, peripheral power 414 supplies power to power interface 420 which provides external peripheral power connection 380 used to display 312 in FIG. 3. It also supplies power interface 422 which provides power connection 382 to speakers 314 in FIG. 3. In the embodiment shown, power interfaces 420 and 422 are a selectable external display power supply, supplying 12 or 18 VDC. Other embodiments of the described system include additional power interfaces to supply additional displays and peripheral devices. Examples include power supplies for a PDA cradle or mobile phone.

Network interface 430 provides an encoded data interface between client processor 440 and Ethernet channel 432 to network 122. The interface includes layers 1 to 3 protocol termination for the Ethernet network by providing PHY, MAC and IP protocol functions.

In the inbound direction, client processor 440 decodes display video signals in addition to peripheral-bound control, audio, or other data streams. In the direction of host PC system 130 (in FIG. 1), client processor 440 encodes control signals, incoming audio signals and other host bound data streams. Client processor 440 provides the buffer management functions for audio or data peripheral interfaces similar to those found in peripheral controllers such as audio or USB controllers to ensure continuous streaming of real-time data.

In the embodiment described, client processor 440 manages other integrated features such as microphone and speaker module 442. In another embodiment, client processor 440 provides security functions that control peripheral device admission or client processor 440 relays admission requests to host PC system 130 or other network-based administration functions. In other embodiments, client processor 440 manages any combination of integrated peripherals, such as those listed in Table 1. Client processor 440 may also execute peripheral admission functions using power allocation methods, such as the methods described in FIG. 5.

Peripheral power interfaces 420 and 422 provide allocated power limits for connected peripheral devices, including one or more display monitors or other peripherals such as those listed in Table 2. Where applicable, power interfaces are controlled by client processor 440 using power control signal 444 to set a voltage and power allocation limit for each peripheral. The power interfaces may manage negotiation of power requirements, for example using power signaling pins or impedance change methods. In an alternative embodiment, power negotiation is conducted using an encoded bitstream on an associated signal interface, such as one of interfaces 425. In one embodiment, a power interfaces also monitors real-time power consumption and provides active current limiting functions. In another embodiment, power interfaces 420 and 422 notify client processor 440 in case of a power violation, power change requests, impedance changes related to power negotiation or other power-related signaling activities. In this case, client processor processes the system power budget and takes power change measures by updating power control module 400. In another alternative embodiment, a power interface has the ability to set a peripheral power limit based on negotiation with a peripheral device. In another alternative embodiment, a peripheral power interface includes a voltage selector switch. One example is a display power interface that allows user selection between 5V and 12V display systems.

Processor 440 also includes peripheral signal interfaces 424 and 426 shown (in addition to the other interfaces 425 required to support the other user interfaces described in FIG. 3). Alternative embodiments support any combination of peripheral signal interfaces as defined in Table 2. Signal interface modules 424 and 426 provide physical and protocol functions necessary to support the specified interface. Signal interface 424 includes a video controller function that generates a raster and delivers a DVI signal. Another display-related example is a DDC interface that provides DDC protocol termination and I2C functions. Interface 426 is an HDA Audio interface that provides codec functions and supplies an analog audio output signal for a set of speakers. One variation on an audio signal interface provides pluggable HDA audio. A second variation is an audio interface integrated with a video interface such as HDMI or DisplayPort interfaces.

Module 300 optionally incorporates other modules and functions. One example is secondary power connection 106 for providing additional power or enabling the normal operation of module 300 in environments where a powered network is unavailable. Auxiliary power interface 450 operates in conjunction with power control module 400 by supplying additional filtered power connection 452. In one variation, power interface 450 is configured by voltage source selector switch 454.

Another example of an additional module is an integrated user interface function such as a status LED or LCD module. The integrated user interface may include input or configuration capabilities, for example IP address configuration, user settable power levels or other functions. Another example of an additional module is a power management module. For example, module 300 may incorporate a power management state machine module such as an Energy Star compliant state machine that manages power and signal interfaces based on inbound peripheral signal conditions. An integrated or peripheral presence detection device may be then be used to influence the power budget set by processor 440 and module 400. Another example of an additional module is additional control interface 428 which provide control connection 332 between module 300 and monitor controls 330 in FIG. 3. Another example of an additional interface is a multi-signal docking connection to an external display subsystem.

Figure 5:
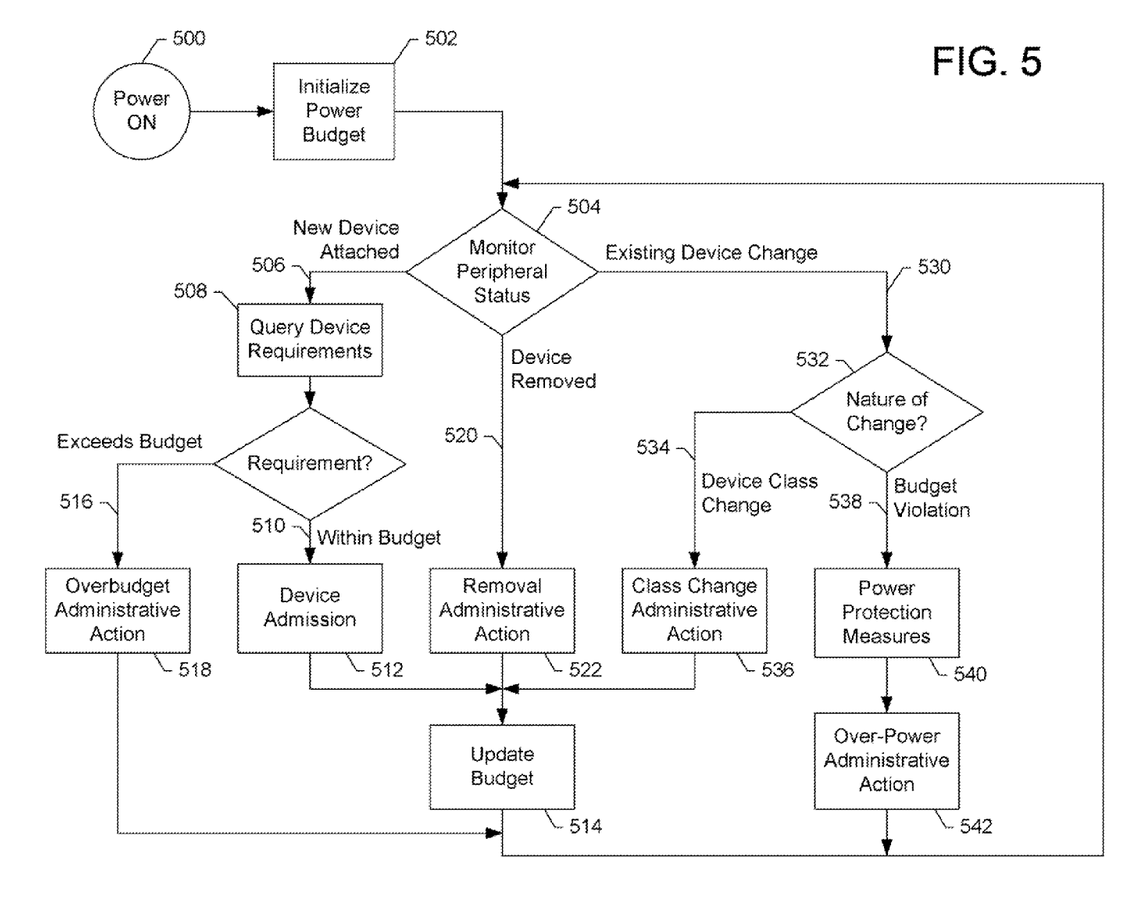
FIG. 5 is a flowchart of a method for power allocation.

FIG. 5 shows a flowchart describing a method of power allocation as may be executed on client processor 440 in FIG. 4. Power-on step 500 includes initial power negotiation with PSE 120 in FIG. 1. In one embodiment, negotiation is in accordance with signaling protocol defined in IEEE 802.3af specification. The power class of module 300 (in FIG. 3) is identified by a hardwired configuration code, a value retrieved from memory or by some other means and maximum operating power requirements are negotiated with PSE 120. After step 500, a system power budget, comprising a power allocation required to support the components integrated onto module 300 (ref. FIG. 3) and power allocation limits associated with each of the power interfaces is initialized as step 502. In one embodiment, power is removed from the power interfaces (reference interface 420 and 422 in FIG. 4), followed by an initialization of each power and signal interface during which any attached devices are detected. Power negotiation may be accomplished using impedance detection, dedicated power signaling pins or the exchange of messages as described in FIG. 4. In an embodiments with multiple peripheral power interfaces, each interface may be assigned a different power allocation limit as long as the total allocation (including power supply 410) is less than the maximum system power budget. In an alternative initialization method, module 300 requests power budget limits from other network-based power administration equipment.

As a next step 504, peripheral status is monitored. In case 506, a new device is attached. The device is allocated the minimal pre-admission power level and the power requirements for the device are queried as step 508. For example, a USB device is queried for its power class as defined by the USB descriptor. In case 510, the requirement is within budget so device admission is authorized and a host administration function is optionally notified of the status. As a next step 514, the current power budget is updated and the system returns to step 504. In one alternative embodiment, an updated system budget is negotiated with PSE 120 (ref. FIG. 1) as step 514 in a case where the admission of a new device results in the sum of power allocated to previously admitted peripheral devices approaches a maximum power threshold. In case 516, power requirements exceed budget so device admission is not authorized. In this case, additional administrative action may be taken as step 518 prior to returning to step 504. For example, a host administration function may be notified or a device priority selection method may be activated. In an alternative method, some or all peripherals are admitted without being queried and are allocated a fixed power value. In this case, devices are assumed to operate within budget.

In case 520, a device is removed so removal administrative action is optionally taken as step 522 and the current power budget is updated as step 514. For example, when the device is removed, a host administration function may be notified. The system then returns to step 504.

In case 530, the power characteristics or consumption of a device changes so step 532 tests the action to be taken dependant on the nature of the change. In one embodiment, a change in power consumption related to one peripheral device has the effect of changing the class of another peripheral device. For example, a mouse changing from a standby mode in which minimal power is consumed to an operational mode in which a nominal power is consumed may trigger an automatic change in power class for an associated display monitor peripheral from a standby power consumption to nominal operating power consumption. In another embodiment, the change is associated with the same device. In case 534 there is a detectable change in class so class change administrative action is taken as step 536. In one embodiment, a detectable change in class results in a request to PSE 120 (in FIG. 1) for additional power on connection 122 and a new system budget is negotiated. In another embodiment, Step 536 includes the notification of the updated system budget to a host computer or other server. The current power budget is then updated as step 514 and the system returns to step 504.

In case 538, the change is a power budget violation so power protection measures are taken as next step 540. In one embodiment, a current limiting function is engaged. In another embodiment, the non-compliant peripheral device is disconnected at the power interface. Over-power administrative action is then optionally taken as step 542 and the system returns to step 504. In one embodiment, a host is notified as step 542.

Figure 6:
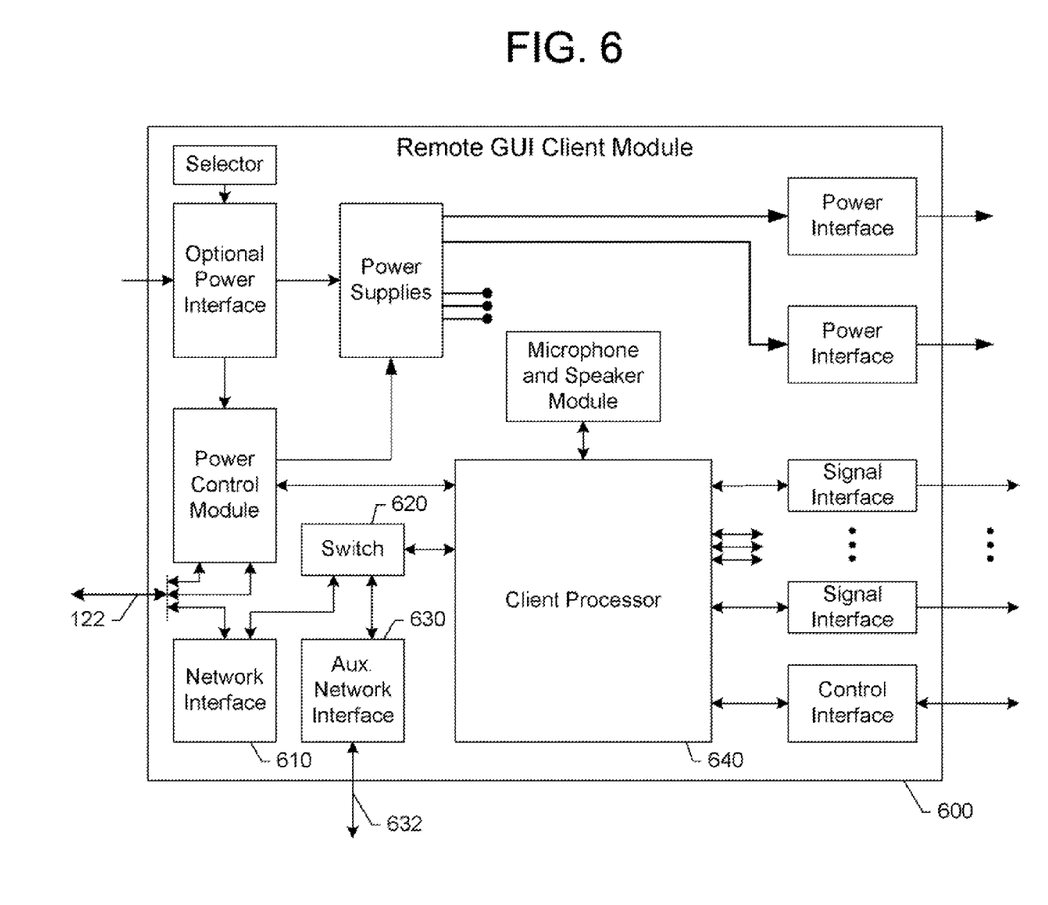
FIG. 6 is an illustration of an alternative embodiment of a client module in which the client module includes an integrated network switch.

FIG. 6 illustrates an alternative client module architecture with an integrated network switch. In the embodiment shown, module 600 has a similar architecture and uses similar methods to those described for module 300 in FIG. 3. However, module 600 includes additional network interface 630 which provides auxiliary connection 632 for additional downstream Ethernet-based peripherals. In the embodiment, module 600 includes network interface 610 that operates similar to network interface 430 in FIG. 4. Rather than communicating directly with client processor 640, network interface 610 is connected to switch 620 which provides switching between upstream network interface 610 and downstream network interface 630.

In one configuration, network interface 630 provides limited PSE capabilities to enable the connection of other powered peripherals such as VoIP phones. In another configuration, network interface 630 provides a standard Ethernet interface to connect to a host appliance or other equipment over a standard Ethernet network.

While methods and apparatus for encoding a shared drawing memory have been described and illustrated in detail, it is to be understood that numerous changes and modifications can be made to embodiments of the present invention without departing from the spirit thereof.

What is claimed is:

1. A method of managing power consumed by a remote graphics user interface system comprising a plurality of peripheral device interfaces, the method comprising:
   initializing a system power budget for the remote graphics user interface system, the remote graphics user interface system powered by a powered network connection having a network connection power budget, the system power budget limited by the network connection power budget, the system power budget comprising power allocation for each in the plurality of peripheral device interfaces;
   setting power conditions for each in the plurality of peripheral device interfaces in accordance with the system power budget; and
   monitoring the plurality of peripheral device interfaces, wherein if at least one requested power requirement for at least one in the plurality of peripheral device interfaces is outside the power allocation for the at least one in the plurality of peripheral device interfaces, then:
   determining an update to the system power budget; and
   updating the power conditions in accordance with the update to the system power budget.

2. The method of claim 1 performed by a remote graphics user interface client module of the remote graphics user interface system, wherein the system power budget further comprises power allocations for the remote graphics user interface client module.

3. The method of claim 1, wherein the determining the update to the system power budget comprises evaluating the at least one requested power requirement outside the power allocation and if the system power budget accommodates the at least one requested power requirement as limited by the network connection power budget, then updating the power allocation for the at least one in the plurality of peripheral device interfaces in accordance with the at least one requested power requirement.

4. The method of claim 1, wherein the determining the update to the system power budget comprises evaluating the at least one requested power requirement outside the power allocation for the at least one in the plurality of peripheral device interfaces and if the system power budget cannot accommodate the at least one requested power requirement as limited by the network connection power budget, then leaving the system power budget essentially unchanged.

5. The method in claim 1 wherein the updating the power conditions comprises taking power protection measures if the at least one requested power requirement exceeds a shutdown limit associated with the system power budget.

6. The method in claim 1 wherein the updating the power conditions comprises changing at least one of power, voltage, impedance or current associated with the at least one in the plurality of peripheral device interfaces and wherein the at least one requested power requirement is received in advance of the updating the power conditions.

7. The method in claim 1 wherein the updating the power conditions further comprises transmitting information associated with the updated power conditions over the powered network to a host computer.

8. The method in claim 1 wherein the updating the power conditions further comprises notifying a peripheral device connected to the at least one in the plurality of peripheral device interfaces.

9. The method of claim 1 wherein the updating the power conditions comprises setting the power condition for the one in the plurality of peripheral device interfaces if peripheral devices are disconnected.

10. The plurality of peripheral device interfaces of claim 1 comprising at least one display monitor interface and at least one universal serial bus interface.

11. The method of claim 1 wherein the at least one in the plurality of peripheral device interfaces is a video signal interface for a display device, a second in the plurality of peripheral device interfaces is a primary power supply interface for the display device and the powered network connection is a Power over Ethernet (PoE) connection.

12. The method of claim 1 wherein the at least one requested power requirement is associated with a peripheral device connected to the at least one in the plurality of peripheral device interfaces.

13. The method of claim 1 wherein the at least one requested power requirement is received from a first one in the plurality of peripheral device interfaces, the first one in the plurality of peripheral device interfaces separate from a second one in the plurality of peripheral device interfaces that is subjected to the updated power conditions.

14. The method of claim 1, wherein the determining the update to the system power budget comprises negotiating a change in the network connection power budget.

15. The method of claim 1 wherein the at least one requested power requirement is received at the at least one in the plurality of peripheral device interfaces as an encoded stream of bits.

16. The method of claim 1 wherein the at least one requested power requirement is received at the at least one in the plurality of peripheral device interfaces as a change in impedance of a peripheral device.

17. The method of claim 1 wherein the at least one requested power requirement is received at the at least one in the plurality of peripheral device interfaces as a signal on at least one connection.

18. A remote graphics user interface system comprising:
a power control module enabled to distribute system power to the remote graphics user interface system;
a powered network interface enabled to source the system power from a powered network;
a plurality of peripheral device interfaces; and
a processor coupled between the powered network interface and the plurality of peripheral device interfaces, the processor enabled to decode and transfer graphics user interface data between the powered network and the plurality of peripheral device interfaces;
wherein the system power distribution to at least one in the plurality of peripheral device interfaces is in accordance with peripheral power allocation information provided by the processor.

19. The remote graphics user interface system of claim 18 wherein the processor is enabled to execute a remote desktop protocol client.

20. The remote graphics user interface system of claim 18 wherein the powered network interface is a Power over Ethernet interface.

21. The remote graphics user interface system of claim 18 wherein the plurality of peripheral device interfaces comprises at least one display monitor interface and at least one universal serial bus interface, the at least one display monitor interface enabled to transmit at least part of the graphics user interface data decoded by the processor.

22. The remote graphic user interface system of claim 18 wherein the power control module is enabled to distribute system power to a plurality of peripheral devices connected to the plurality of peripheral device interfaces in compliance with a connection power budget provided by the processor.

23. At least one in the plurality of peripheral device interfaces of claim 18 comprising a signal interface enabled to receive power requests from a peripheral device, the at least one in the plurality of peripheral device interfaces further comprising a power interface enabled to provide, to the peripheral device, power associated with the system power distribution.

24. The power control module of claim 18 enabled to request a change in power supplied from the powered network.

* * * * *